(12) United States Patent
Katsuta et al.

(10) Patent No.: US 7,245,986 B2
(45) Date of Patent: Jul. 17, 2007

(54) CONTROL DEVICE FOR USE IN INJECTION MOLDING MACHINE

(75) Inventors: Hiroshi Katsuta, Gotemba (JP);
Yasumasa Sugiyama, Numazu (JP);
Ryoji Tominaga, Hoffmann Estates, IL (US); Toshihiro Tanaka, Tagata-gun (JP); Masamitsu Suzuki, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/402,265

(22) Filed: Apr. 12, 2006

(65) Prior Publication Data

US 2006/0241805 A1    Oct. 26, 2006

(30) Foreign Application Priority Data

Apr. 14, 2005 (JP) ............................ 2005-1171148

(51) Int. Cl.
*G06F 19/00* (2006.01)
(52) U.S. Cl. ...................... 700/204; 700/159; 264/40.5
(58) Field of Classification Search ................ 700/202, 700/204, 200, 159; 264/40.5, 40.1; 425/150
See application file for complete search history.

(56) References Cited

U.S. PATENT DOCUMENTS

2003/0147984 A1* 8/2003 Zufle ........................ 425/143
2004/0139810 A1* 7/2004 Saito et al. ................. 73/865.9
2005/0181088 A1* 8/2005 Uchiyama et al. .......... 425/139
2005/0245625 A1* 11/2005 Miyazaki .................... 521/50

FOREIGN PATENT DOCUMENTS

JP      2001-191383        7/2001

* cited by examiner

*Primary Examiner*—Kidest Bahta
(74) *Attorney, Agent, or Firm*—DLA Piper US LLP

(57) ABSTRACT

In an injection molding machine configured to extrude a melted resin under temperature control and inject the resin into metal molds to provide a molded product, there are provided an HMI section having a built-in general-purpose operating system and configured to control a display section equipped with a touch panel, control modules, such as a main control section, a sequence processing section and a servo command section, having a dedicated microprocessor for each control element of the injection molding machine, and a driver section having servo amplifiers, hydraulic drivers, and so on, configured to be controlled by the control modules and to drive-control an actuator of the injection molding machine, in which, by variously combining together the control modules, it is possible to provide various kinds of injection molding machines, that is, an electric operation type, a hydraulic type and a hybrid type of these combination.

15 Claims, 4 Drawing Sheets

CONTROL DEVICE FOR USE IN INJECTION MOLDING MACHINE

CROSS-REFERENCE TO RELATED APPLICATIONS

This application is based upon and claims the benefit of priority from prior Japanese Patent Application No. 2005-117148, filed Apr. 14, 2005, the entire contents of which are incorporated herein by reference.

BACKGROUND OF THE INVENTION

1. Field of the Invention

The present invention relates to a control apparatus for use in an injection molding machine.

2. Description of the Related Art

Known is, for example, an injection molding machine as disclosed in Jpn. Pat. Appln Kokai Publication No. 2001-191383.

An injection molding machine may use various kinds of controls, such as in the injection, in measuring, in mold opening and closing, in extruding, and in the application of temperature.

In the injection molding machine of the above Publication, control of the injection molding is performed by a specific control device that is usable only for the injection molding machine.

A type of Control of an actuator in the injection molding machine, as well as measuring, mold opening/closing and extrusion operations is selected depending on whether an electrical operation type or a hydraulic type is used.

Thus, the use of such control types differs depending on whether an electrical type of operation, a hydraulic type of operation or a hybrid type of operation is used.

In the prior art, when a control target is an electrical operation of an actuator, a dedicated control device has been used and, when the control target is a hydraulic operation, a corresponding special control device has been used.

Therefore, the conventional injection molding device requires a dedicated control device. As a result it is difficult to provide a general-purpose machine.

BRIEF SUMMARY OF THE INVENTION

An aspect of the present invention is to provide a control device for use in an injection molding machine. When a control target in the injection molding machine is changed, the control device can be tailored to each control element. As a result, the control device can handle such a situation through a combination of control modules. Thus, a general-purpose machine unit can be provided.

In one aspect of an embodiment of the present invention there is provided an injection molding machine for heating a synthetic resin material and, injecting a predetermined amount of molten synthetic resin material into a melted mold to obtain a molded product. The injection molding machine comprises a human/machine interface device having a general-purpose operating system. The interface device is configured to control a display section, to control a plurality of control modules having a dedicated microprocessor for each control element of the injection molding machine, and to control a driver, the driver section being configured to drive-control an actuator of the injection molding machine, wherein various kinds of injection molding controls can be performed through a specific combination of various control modules.

Additional aspects of various embodiments the invention will be set forth in the description which follows, and in part will be obvious from the description, or may be learned by practice of the invention. Aspects of the invention may be realized and obtained by means of instrumentation and combinations particularly pointed out hereinafter.

BRIEF DESCRIPTION OF THE SEVERAL VIEWS OF THE DRAWING

The accompanying drawings, which are incorporated herein and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will be described below with reference to the accompanying drawing.

Figure 1:
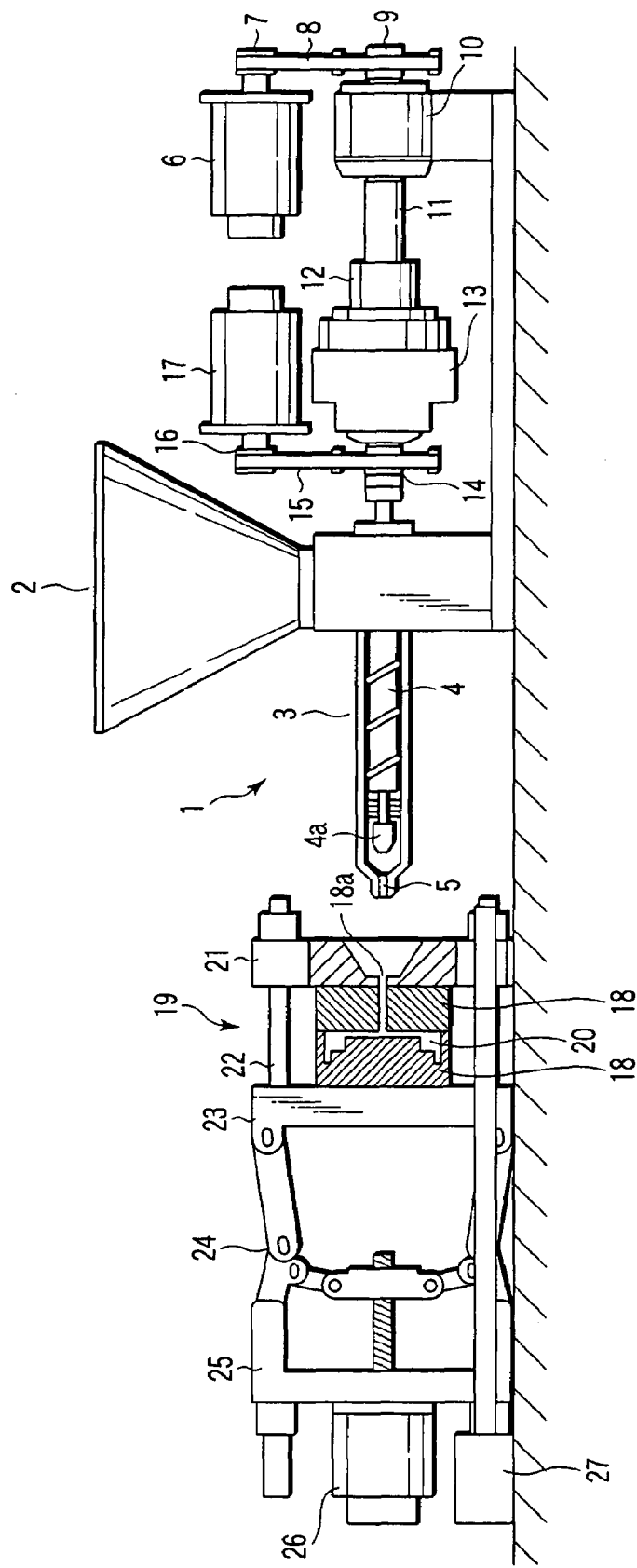
FIG. 1 shows a structure of an electrical operating type injection molding machine, according to one embodiment of the present invention.

FIG. 1 shows an electrically operated injection molding machine.

The injection molding machine includes an injection molding machine body 1, an injection screw 4 arranged so as to be inserted into a cylindrical barrel 3. The injection machine also includes a hopper 2.

The injection screw 4 is rotatable in the barrel 3 and freely movable forward and backward.

The barrel 3 communicates with the hopper 2. A synthetic resin material is fed into the barrel through the hopper 2. A plurality of heaters, not shown, are arranged at predetermined intervals on the outer periphery side of the barrel 3. These heaters are adapted to heat the outer periphery of the barrel and melt the resin material fed into the barrel 3.

The barrel 3 has an injection nozzle 5 at a forward end of the barrel 3 to allow the melted synthetic resin material to be injected.

A heating temperature of the barrel 3 is controlled by the plurality of heaters so that the melting degree of the melted resin material gradually increases when the resin moves toward the forward end of the barrel 3.

The injection screw 4 is rotatably driven by a servomotor 6 for injection and moved forward and backward. That is, the servomotor 6 for injection transmits its rotation to a ball screw shaft 11 through a transmission mechanism comprising a pulley 7, a timing belt 8 and a timing pulley 9.

The ball screw shaft 11 is rotatably provided in a servo bracket 10.

The ball screw shaft 11 is set in a ball nut 12. The ball nut 12 is fixed by bolts to a thrust box 13.

The injection screw 4 is rotatably joined at its rear end portion to the thrust box 13 through an S shaft and bearing (not shown).

The S shaft is rotatably connected to the thrust box 13 and mounted to a timing pulley 14.

A servomotor 17 is also provided. The servomotor 17 has a rotation shaft which is connected to a pulley 16.

A timing belt 15 is provided between the timing pulley 14 and the pulley 16.

The timing pulley 14, timing belt 15 and pulley 16 constitute a transmission mechanism.

The servomotor 17 moves the injection screw 4 material which is to be injected forward, determining an amount of the melted resin. The servomotor 17 transmits its rotation to the S shaft as set out above through the associated transmission mechanism as set out above to allow the injection screw 4 to be rotated.

The forward moving position of the injection screw 4 is determined by an amount of synthetic resin material injected.

In the forward position of the barrel 3 are provided metal mold halves 18 and a device 19 for opening/closing and clamping the metal molds.

When the melted resin material is injected from the injection nozzle 5, the injection nozzle 5 is pushed into a nozzle inlet 18a of one metal mold half 18. In this state, the forward end 4a of the injection screw 4 is moved forward and, by doing so, allows the resin material which is melted in the barrel 3 to be injected through the injection nozzle 5. Thus, the resin material is charged into a cavity 20 defined by the metal mold halves 18.

The device 19 has a fixing plate 21 that supports one of the metal mold halves 18. A movable plate 23 is provided. The movable plate 23 holds a tie bar 22 which in turn supports the fixing plate 21. The movable plate 23 can move toward and away from the fixing plate 21.

The device 19 attaches the movable plate 23 to a toggle mechanism support plate 25 through a toggle type mold clamping mechanism 24.

A servomotor 26 is provided on the toggle mechanism support plate 25 to drive the toggle type clamping mechanism 24. A mold thickness adjusting mechanism 27 is provided. The mechanism 27 adjusts a mold thickness when the toggle type mold clamping mechanism 24 effects the mold clamping operation.

In the electrical type injection molding machine thus structured, the servomotor 26 is first driven for mold clamping. By doing so, the metal molds 18 start their mold closing operation. In addition, the injection nozzle 5 of the barrel 3 is pushed into the nozzle 18a of the mold halves 18.

Then, the measuring servomotor 17, while being rotated, moves the injection screw 4 forward and effects a quantity of the melted resin material injected. Then, the injection servomotor 6 rotates the injection screw 4 to inject the melted resin.

The barrel 3 injects the melted resin through the injection nozzle 5 and charges the melted resin into the cavity 20 of the metal molds 18.

Figure 2:
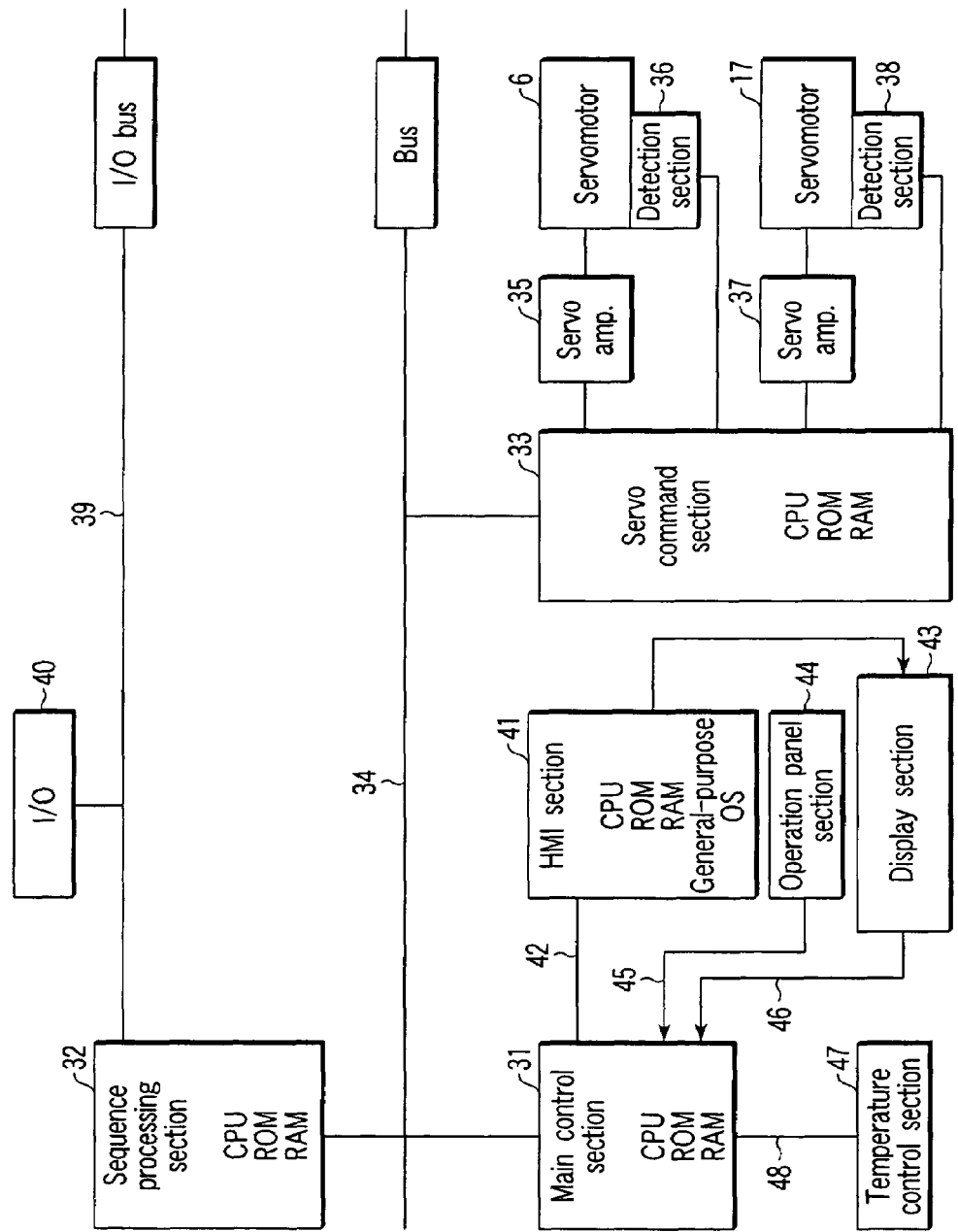
FIG. 2 is a block diagram showing a control device of the injection molding machine body, according to an embodiment of the present invention.

As shown in FIG. 2, a control device of the electrical type injection molding machine 1 includes a main control section 31 for controlling each part of the injection molding machine, a sequence processing section 32 and a servo command section 33.

The main control section 31 includes a CPU, ROM, RAM, etc. The main control section 31 allows to manage and monitor the injection molding machine 1.

The sequence processing section 32 has a CPU, ROM, RAM, etc. The sequence processing section 32 allows to control the operation sequence of the injection molding machine 1.

The servo command section 33 has a CPU, ROM, RAM, etc. The serve command section 33 allows to control the injection servomotor 6 and the measuring servomotor 17.

The main control section 31, the sequence processing section 32 and the servo command section 33 are electrically connected together through a bus line 34.

The servo command section 33 controls a servo amplifier 35 in a driver section and drives the injection servomotor 6. The rotation and current value of the injection servomotor 6 are detected by a detection section 36.

The servo command section 33 receives a signal from the detection section 36 and detects the moved position and rotation speed of the injection screw 4 and the current value in the motor. Furthermore, the servo command section 33 performs feedback control based on the detected moved position of screw 4 and rotation speed of the screw 4 and current value in the motor and thus controls the servomotor 6.

The servo command section 33 controls the servo amplifier 35 in the driver section and drives the servomotor 17 for measurement. The rotation and current value of the measuring servomotor 17 are detected by a detection section 38.

The servo command section 33 receives a signal from the detection section 38 and detects the moved position and rotation speed of the injection screw 4 and current value of the servomotor. Furthermore, the servo command section 33 performs feedback control based on the moved position of screw 4 and rotation speed of the screw 4 and current value in the servomotor 17. The servo command section 33 also controls the servomotor 17 for measurement.

An I/O 40, etc., is electrically connected via I/O bus 39 to the sequence processing section 32.

The main control section 31, sequence processing section 32 and servo command section 33 each constitute a control module with a dedicated microprocessor for each control module.

The main control section 31 includes a communication interface section such as HMI section 41. HMI section 41 is a human/machine interface device that is electrically connected to the main control section 31 through a LAN 42 such as Ethernet (registered trademark name).

The HMI section 41 includes a CPU, ROM, RAM, etc., and general-purpose OS (operating system).

The HMI section 41 is comprised of, for example, a personal computer and connected to a display section 43. The display section 43 has a touch panel on a liquid crystal display screen to allow the display screen to be controlled.

The main control section 31 is connected via a cable 45 to an operation panel section 44. The operation panel section 44 has a plurality of mechanical operation switches.

The main control section 31 is connected via a cable 46 to the touch panel of the display section 43.

The main control section 31 is connected via a cable 48 to a temperature control section 47. The temperature control section 47 controls the heating temperature of the plurality of heaters arranged on the outer periphery of the barrel 3.

The display section 43 allows to display control parameters via the HMI section 41 and allows touch panel of the display section 43 to be controlled by the main control section 31.

The display section 43 outputs a key signal to the main control section 31 by finger-touching any corresponding key on the touch panel on the display screen.

In such arrangement, the main control section 31 controls the temperature control section 47. The temperature control section 47 controls the heating temperature of the plurality of heaters to melt the synthetic resin material transferred from the hopper 2 into the barrel 3.

When the resin material is injected through the injection nozzle 5 of the barrel 3 into the cavity 20, the sequence processing section 32 and servo command section 33 are controlled.

First, the servo command section 33 controls the servo amplifiers 37 and drives the measuring servomotor 17. The servomotor 17 rotates the injection screw 4 to move the melted resin forward and determine the melted resin amount injected from the barrel 3.

Then, while the injection screw 4 is rotated, the injecting servomotor 6 is driven to move the resin forward. The injection screw 4 pushes the melted resin through the injection nozzle 5 via the forward end 4a. By doing so, the mold cavity 20 is filled with the melted resin which is through the injection nozzle 5 past the nozzle inlet 18a of the mold halves 18.

When the filling of the melted resin material is finished, the device 19 is operated for the closing and clamping of the mold halves 18. The mold halves 18 are moved apart from the barrel 3. The device 19 opens the metal molds and a molded product is taken out from the metal mold halves 18.

The above description of operation is for the electrical type injection molding machine. However, it is also possible to use a hydraulic type injection molding machine in place of the electrical type injection molding machine.

In the case of the hydraulic type injection molding machine, a hydraulic driver for relief/flow control is used. In this case, the injection servomotor 6 and measuring servo motor 17 may not be used.

A control device of the hydraulic type injection molding machine does not use the servo command section 33 and servo amplifiers 35, 37 connected to the servo command section 33 as well as the injection servomotor 6, measuring servomotor 17 and so on.

Figure 3:
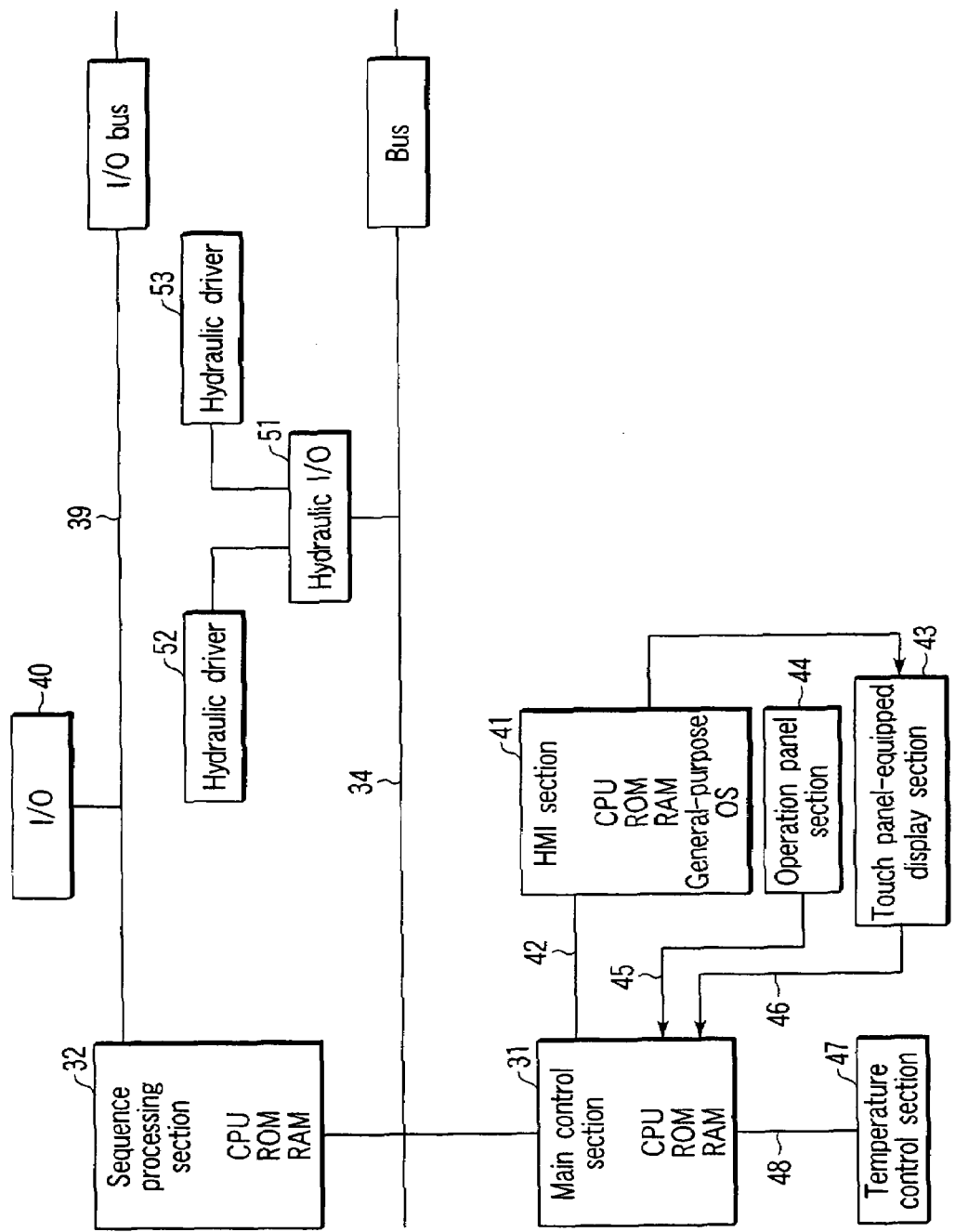
FIG. 3 is a block diagram of a control device of the injection molding machine body when used in a hydraulic-type injection molding machine, according to an embodiment of the present invention.

As shown in FIG. 3, the control device disconnects the servo command section 33 and servo amplifiers 35, 37 connected to the section 33 as well as the injection servomotor 6 and measuring servomotor 17 and so on and, instead, connects a hydraulic I/O 51 to a bus line 34. In this case, the hydraulic I/O 51 is connected to hydraulic drivers 52 and 53.

The hydraulic driver 52 moves the injection screw 4 forward and backward so that the injection screw 4 injects the molted resin. On the other hand, the hydraulic driver 53 moves the injection screw forward and backward so that the hydraulic driver 53 measures an amount of melted resin injected.

When the injection molding machine is changed from the electrical type injection molding machine to the hydraulic type injection molding machine, a change is made to the configuration of the injection screw. Indeed, the injection screw 4 driven by the injection servomotor 6 in an electrical type injection molding machine is changed to an injection screw driven under a hydraulic pressure in a hydraulic type injection molding machine.

A barrel 3 having a different structure is employed in the hydraulic type injection molding machine compared to a barrel 3 in the electrical operation type injection molding machine. As such, the injection molding machine per se maybe wholly replaced.

However, the control device has a dedicated CPU for each of the main control section 31, the sequence processing section 32, and the servo command section 33. The control device provides a control module, that is, a unit modularized for each control element. Therefore, the main control section 31, the sequence processing section 32, and the servo command section 33 in the main control device are individually exchangeable.

In this way, when the injection molding machine is changed from the electrical operation type to the hydraulic type, the servo command section 33 and so on are disconnected from an associated circuit and, instead, the hydraulic I/O 51 is connected to the bus line 34. The hydraulic I/O 51 is connected to hydraulic drivers 52 and 53. In this case, if the sequence processing section 32 in the electrical type injection molding machine is different from a sequence processing section 32 in the hydraulic type injection molding machine, an appropriate hydraulic type sequence processing section can be used.

As a result, even if a change is made from the electrical type injection molding machine to the hydraulic type injection molding machine, replacing the control device as a whole, may not be needed. In this case, an exchange may be made in control module units.

It is also possible for the injection molding machine to use any proper electrical type/hydraulic type combination as a hybrid type injection molding machine.

Figure 4:
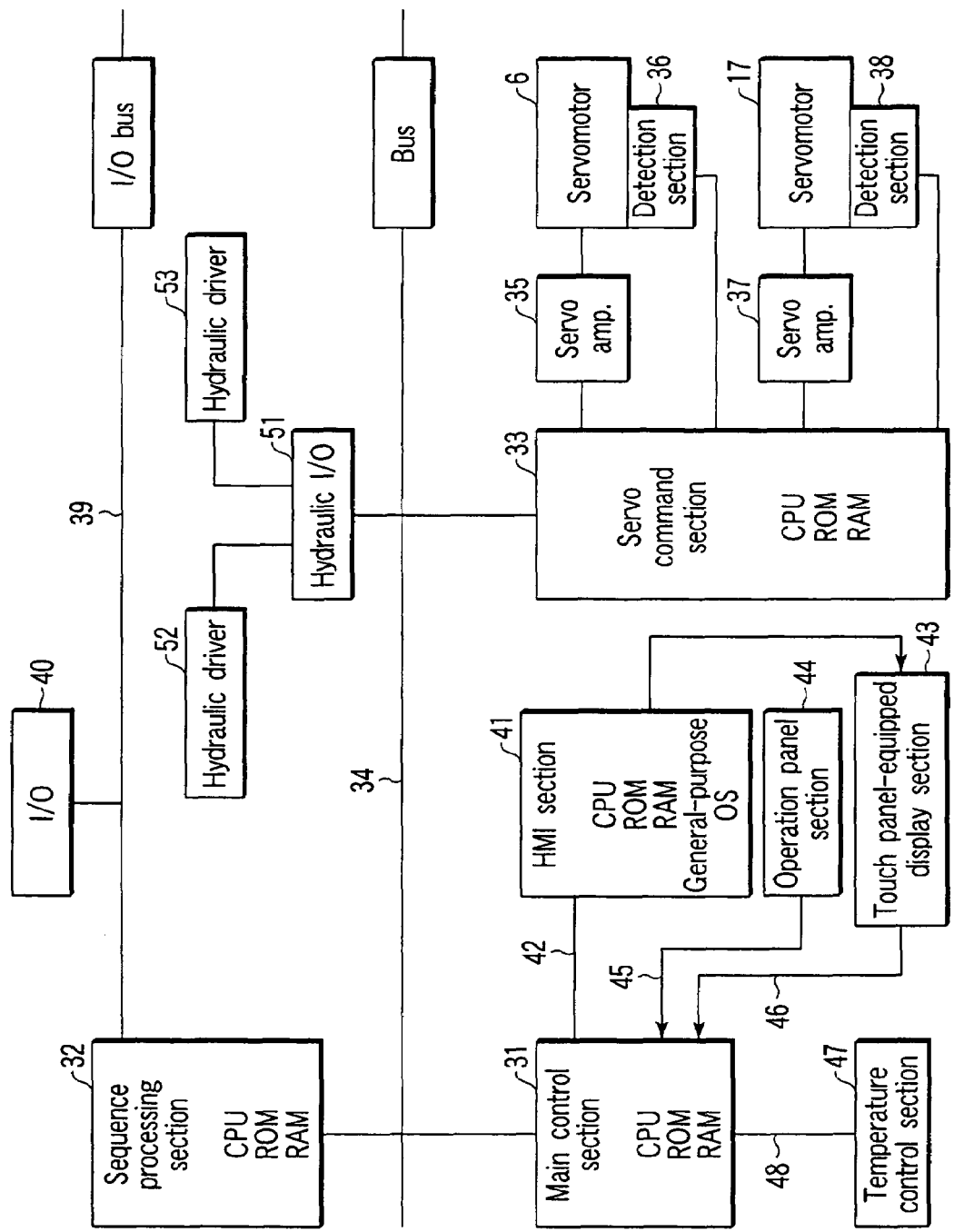
FIG. 4 is a block diagram of a control device of the injection molding machine body when used in a hybrid-type injection molding machine, according to an embodiment of the present invention.

A control device that can be used in the hybrid type injection molding machine, is shown in FIG. 4. A hydraulic I/O 51 is connected to a bus line 34 as in the control device shown in FIG. 2. The hydraulic I/O 51 is connected to the hydraulic drivers 52 and 53. Furthermore, a sequence processing section 32 is replaced by a hybrid type. Thus, it may not be necessary to replace the control device as a whole.

Incidentally, the sequence processing section 32 has initially a built-in sequence control program corresponding to an electrical, a hydraulic and a hybrid type operation. The sequence processing section 32 is constructed so that any corresponding sequence control program can be selected.

Accordingly, the sequence processing section 32 is not replaced by a new one and can be readily tailored to meet a specific need by selecting any sequence control program.

As evident from the above, even if the injection molding machine is changed to any of the electrical, hydraulic and hybrid type operation, the control device does not need to be changed as a whole. It is possible to readily adapt to any configuration through the change of any possible control module combination. As a result, the control device provides an excellent general-purpose device and provides higher economic benefits.

Furthermore, the control device described herein achieves an enhanced processing capability, by allowing the exchange of the main control section 31 and sequence processing section 32.

What is claimed is:

1. A control device for use in an injection molding machine for melting synthetic resin material and injecting a predetermined amount of molten synthetic resin material into a metal mold to obtain a molded product, comprising:

a plurality of exchangeable control modules configured to be mutually connected by a bus line, each module in the plurality of exchangeable control modules having a dedicated microprocessor for each control element in the injection molding machine;

a human/machine interface device configured to be connected to one of the plurality of control modules, the human/machine interface device having a general-purpose operating system configured to control a display section; and a driver section configured to be connected to one of the plurality of control modules, the driver section being configured to be controlled by a control module connected to the driver section, the driver section being configured to drive-control an actuator of the injection molding machine, wherein said plurality of control modules are configured to control the melting of the synthetic resin material in a barrel of the injection molding machine, to control an amount of the melted resin to be injected, or to control the injection of the measured amount of resin from an injection nozzle of the barrel, or to perform any combination of two or more thereof, wherein one of said plurality of control modules comprises a servo command section connected to the driver section, said driver section being configured to control a rotation of a measuring servomotor, the measuring servomotor being configured to drive an injection screw to inject a predetermined amount of the melted resin, the driver section being further configured to control an injection servomotor, the injection servomotor being configured to drive the injection screw to inject the melted resin through the injection nozzle.

2. A control device according to claim 1, wherein one of said plurality of control modules comprises a main control section connected to the human/machine interface device, the main control section being configured to control one or more part of the injection molding machine.

3. A control device according to claim 1, wherein one of said plurality of control modules comprises a sequence processing section, the sequence processing section being configured to control an operation sequence of the injection molding machine.

4. A control device according to claim 1, wherein the display section controlled by the human/machine interface device comprises a display section having a touch panel set on a liquid crystal display screen.

5. A control device according to claim 2, wherein the main control section is configured to control the temperature of the barrel for allowing the melting of the synthetic resin material through application of heat.

6. A control device for use in an injection molding machine for melting synthetic resin material and injecting a predetermined amount of molten synthetic resin material into a metal mold to obtain a molded product, comprising:
    a plurality of exchangeable control modules configured to be mutually connected by a bus line, each module in the plurality of exchangeable control modules having a dedicated microprocessor for each control element in the injection molding machine;
    a human/machine interface device configured to be connected to one of the plurality of control modules, the human/machine interface device having a general-purpose operating system configured to control a display section; and
    a driver section configured to be connected to one of the plurality of control modules, the driver section being configured to be controlled by a control module connected to the driver section, the driver section being configured to drive-control an actuator of the injection molding machine,
    wherein said plurality of control modules are configured to control the melting of the synthetic resin material in a barrel of the injection molding machine, to control an amount of the melted resin to be injected, or to control the injection of the measured amount of resin from an injection nozzle of the barrel, or to perform any combination of two or more thereof,
    wherein one of said plurality of control modules comprises a hydraulic I/O, the hydraulic I/O being configured to be connected to the driver section, the hydraulic I/O being configured to control a hydraulic driver for moving the injection screw to measure a predetermined amount of the melted resin and to control another hydraulic driver for driving the injection screw to inject the melted resin through the injection nozzle.

7. A control device according to claim 6, wherein one of said plurality of control modules comprises a main control section connected to the human/machine interface device, the main control section being configured to control one or more part of the injection molding machine.

8. A control device according to claim 6, wherein one of said plurality of control modules comprises a sequence processing section, the sequence processing section being configured to control an operation sequence of the injection molding machine.

9. A control device according to claim 6, wherein the display section controlled by the human/machine interface device comprises a display section having a touch panel set on a liquid crystal display screen.

10. A control device according to claim 7, wherein the main control section is configured to control the temperature of the barrel for allowing the melting of the synthetic resin material through application of heat.

11. A control device for use in an injection molding machine for melting synthetic resin material and injecting a predetermined amount of molten synthetic resin material into a metal mold to obtain a molded product, comprising:
    a plurality of exchangeable control modules configured to be mutually connected by a bus line, each module in the plurality of exchangeable control modules having a dedicated microprocessor for each control element in the injection molding machine;
    a human/machine interface device configured to be connected to one of the plurality of control modules, the human/machine interface device having a general-purpose operating system configured to control a display section; and
    a driver section configured to be connected to one of the plurality of control modules, the driver section being configured to be controlled by a control module connected to the driver section, the driver section being configured to drive-control an actuator of the injection molding machine,
    wherein said plurality of control modules are configured to control the melting of the synthetic resin material in a barrel of the injection molding machine, to control an amount of the melted resin to be injected, or to control the injection of the measured amount of resin from an injection nozzle of the barrel, or to perform any combination of two or more thereof,
    wherein one of said plurality of control modules comprises:
        (i) a servo command section connected to the driver section, said driver section being configured to control a rotation of a measuring servomotor, the measuring servomotor being configured to drive an injection screw to inject a predetermined amount of the melted resin, the driver section being further configured to control an injection servomotor, the injection servomotor being configured to drive the injection screw to inject the melted resin through the injection nozzle, and (ii) a hydraulic I/O, the hydraulic I/O being configured to be connected to the driver section, the hydraulic I/O being configured to control a hydraulic driver for moving the injection screw to measure a predetermined amount of the melted resin and to control another hydraulic driver for driving the injection screw to inject the melted resin through the injection nozzle.

12. A control device according to claim 11, wherein one of said plurality of control modules comprises a main control section connected to the human/machine interface device, the main control section being configured to control one or more part of the injection molding machine.

13. A control device according to claim 11, wherein one of said plurality of control modules comprises a sequence processing section, the sequence processing section being configured to control an operation sequence of the injection molding machine.

14. A control device according to claim 11, wherein the display section controlled by the human/machine interface device comprises a display section having a touch panel set on a liquid crystal display screen.

15. A control device according to claim 12, wherein the main control section is configured to control the temperature of the barrel for allowing the melting of the synthetic resin material through application of heat.

* * * * *